US008722141B2

(12) United States Patent
Weidhaus et al.

(10) Patent No.: US 8,722,141 B2
(45) Date of Patent: May 13, 2014

(54) PROCESS FOR THE CONTINUOUS PRODUCTION OF POLYCRYSTALLINE HIGH-PURITY SILICON GRANULES

(75) Inventors: Dieter Weidhaus, Burghausen (DE); Rainer Hauswirth, Kirchdorf (DE); Harald Hertlein, Burghausen (DE)

(73) Assignee: Wacker Chemie AG, Munich (DE)

( * ) Notice: Subject to any disclaimer, the term of this patent is extended or adjusted under 35 U.S.C. 154(b) by 1623 days.

(21) Appl. No.: 12/111,291

(22) Filed: Apr. 29, 2008

(65) Prior Publication Data

US 2008/0299291 A1    Dec. 4, 2008

(30) Foreign Application Priority Data

May 4, 2007 (DE) .......................... 10 2007 021 003

(51) Int. Cl.
*B05D 7/00* (2006.01)
*B05C 11/00* (2006.01)

(52) U.S. Cl.
USPC ................................ 427/213; 427/8; 118/689

(58) Field of Classification Search
None
See application file for complete search history.

(56) References Cited

U.S. PATENT DOCUMENTS

| | | | |
|---|---|---|---|
| 3,963,838 A | 6/1976 | Setty et al. | |
| 4,651,807 A * | 3/1987 | Newby | 165/104.16 |
| 4,992,245 A | 2/1991 | Van Slooten et al. | |
| 5,374,413 A | 12/1994 | Kim et al. | |
| 5,798,137 A | 8/1998 | Lord et al. | |
| 5,810,934 A | 9/1998 | Lord et al. | |
| 6,007,869 A | 12/1999 | Schreieder et al. | |
| 6,274,191 B1 * | 8/2001 | Emken | 427/8 |
| 6,827,786 B2 | 12/2004 | Lord et al. | |
| 7,029,632 B1 * | 4/2006 | Weidhaus et al. | 422/139 |
| 2005/0135986 A1 * | 6/2005 | Weidhaus et al. | 423/348 |
| 2008/0241046 A1 | 10/2008 | Hertlein et al. | |

FOREIGN PATENT DOCUMENTS

| | | |
|---|---|---|
| DE | 199 48 395 A1 | 5/2001 |
| EP | 0896952 A1 | 2/1999 |
| GB | 2271518 A | 4/1994 |
| JP | 2-279513 | 11/1990 |
| WO | 2004013044 A1 | 2/2004 |
| WO | 2007028776 A2 | 3/2007 |

(Continued)

OTHER PUBLICATIONS

Fluidized-Bed Silane-Decomposition Reactor, NTIS Tech Notes, US Department of Commerce Springfield, VA, US, Mar. 1, 1992 (19920os-01), p. 209, XP000291054—ISSN: 0889-8464.

(Continued)

*Primary Examiner* — Michael Cleveland
*Assistant Examiner* — Joel Horning
(74) *Attorney, Agent, or Firm* — Brooks Kushman P.C.

(57) ABSTRACT

High-purity polysilicon granules are prepared by depositing reaction gas on silicon granules in a fluidized bed reactor having:
  a reactor space comprising at least two zones lying one above the other, the lower zone weakly fluidized by introduction of a silicon-free gas into silicon granules in the lower zone by a plurality of individual dilution gas nozzles, and a second, reaction zone directly abutting the lower zone,
the reaction zone heated via its outwardly bounding wall,
  introducing silicon-containing reaction gas as a vertical high speed gas jet into the reaction zone by reaction gas nozzle(s), forming local reaction gas jets surrounded by bubble-forming fluidized bed, gas decomposing leading to particle growth,
wherein the reaction gas has fully or almost fully reacted to chemical equilibrium conversion before reaching the wall or bed surface.

19 Claims, 1 Drawing Sheet

(56) References Cited

FOREIGN PATENT DOCUMENTS

| | | |
|---|---|---|
| WO | 2007091834 A1 | 8/2007 |
| WO | 2007094607 A1 | 8/2007 |
| WO | 2008018760 A1 | 2/2008 |

OTHER PUBLICATIONS

English Patent Abstract corresponding to JP 2-279513, retrieved Jun. 27, 2008.
Kunii et al., "Fluidization Without Carryover of Particles," Fluidization Engineering, Butterworth-Heinemann, 2nd Edition, 1991, p. 69.

* cited by examiner

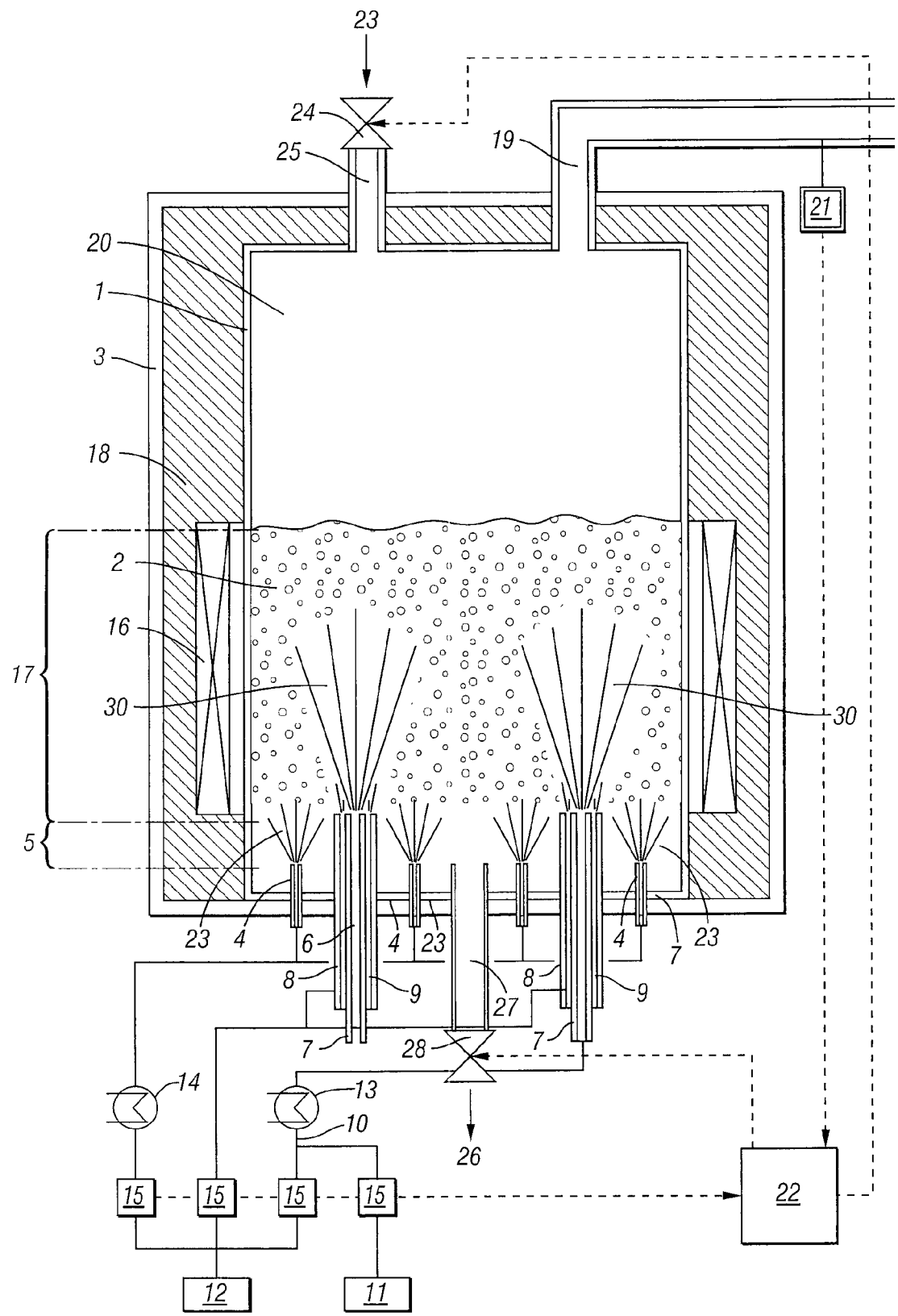

PROCESS FOR THE CONTINUOUS PRODUCTION OF POLYCRYSTALLINE HIGH-PURITY SILICON GRANULES

BACKGROUND OF THE INVENTION

1. Field of the Invention

The subject invention pertains to a continuous process for the production of high purity polycrystalline silicon in a fluidized bed reactor.

2. Background Art

In a simplified explanation, during fluidized bed deposition of polysilicon in a reactor, a bed of silicon particles is initially introduced, the bed is fluidized by a gas, and heated by a suitable device to the temperature required for the deposition reaction. A silicon containing compound contained in the gas, generally silane $SiH_4$ or halosilanes $SiH_xX_y$ (Cl, Br, I, F), decomposes at the hot particle surfaces in a pyrolysis reaction with formation of elemental silicon that deposits on the surface of the silicon particles in the fluidized bed and leads to growth in size of the particles. The process can be operated continuously in the steady state if particles that have grown in size are continuously removed as product from the fluidized bed and particles of smaller size, so called silicon seed particles, are fed to the fluidized bed again.

In general, not only the silicon containing compound but also a silicon-free gas, which is referred to hereinafter as a "dilution gas," is fed to the fluidized bed. Examples of dilution gases are hydrogen, nitrogen and argon. The feeding of the silicon containing compound, by itself or mixed with dilution gas, is referred to below as the "reaction gas."

The central problem in the fluidized bed deposition of silicon is the fact the silicon containing gaseous compounds react not only at the hot particle surfaces, but also, undesirably, at hot reactor components. This affects in particular the wall of the fluidized bed. In the absence of special measures, a silicon layer deposits on the wall, becomes thicker and thicker over the operating time of the reactor, and thus limits the maximum operating time. This problem is particularly serious because the fluidized bed is generally heated precisely by the wall and a growing silicon layer impairs the heating function, since it represents a thermal insulator. Mechanical stresses on account of the different thermal expansion of wall material and grown silicon layer can also lead to chipping off of parts of the silicon layer or even to the breaking of the fluidized bed wall. Besides deposition on the wall of the fluidized bed, a further problem is deposition of solid silicon on the reactor components which serve for admitting the reaction gas, that is to say the silicon containing gas or gas mixture, into the fluidized bed. Here the wall deposition can lead so far as complete blockage of the inlet.

An elementary factor in fluidized bed deposition is the net heating requirement of the fluidized bed: the amount of heat fed to the reactor via the reactor wall. This has a great influence on the cost of the process. With increasing deposition on the reactor parts, the energy requirement increases and, in the extreme case, the reactor can no longer be heated and has to be shut down. The net heating requirement results for the most part from the difference between fluidized bed temperature and temperature of the gases fed. By contrast, the reaction enthalpy of the gas phase deposition is of secondary importance. The fluidized bed temperature corresponds to the required reaction temperature for the pyrolysis reaction and depends greatly on the type and concentration of the silicon-containing compound.

The major requirement of the polysilicon product of the fluidized bed deposition is the very high purity demanded. In general, the contamination by metals should be less than 100 ppbw, the contamination by the dopants boron and phosphorus should be less than 1000 pptw, and the contamination by carbon should be less than 1000 ppbw.

Fluidized bed processes for the production of silicon granules by solid deposition from the gas phase are known from numerous publications and patents. Various approaches for solving the problems described are mentioned in the literature:

U.S. Pat. No. 3,963,838 describes a process in which the coating on the reactor wall made of quartz chips off continuously from the quartz wall in the process. What is disadvantageous is that the chipped material from the wall has different characteristics than spherical granules, and there is also the risk of quartz glass breakage in the course of the chipping. The granules may likewise contain undesirable quartz as a result of the wall chipping.

JP 2279513 describes a process with a fluidized bed of simple construction. The reaction gas flows in via a distributor plate at the bottom of the fluidized bed. The fluidized bed is heated conventionally via the wall. In order to prevent the bottom of the gas distributor from being blocked by wall deposition, a small amount of HCl is metered into the reaction gas. As a result of a reduction reaction, Si is thus reduced to chlorosilanes in the inlet region of the reaction gas and the wall deposition is thus reduced or prevented in this region. What is disadvantageous about this method, however, is that wall deposition is not prevented in the region of reactor heating, and high thermal losses arise at the bottom of the fluidized bed. Furthermore, in the case of this procedure, silicon granules are taken off in the reaction gas atmosphere and, as a result, have to be additionally purged (inertized).

U.S. Pat. No. 4,992,245 discloses a method for preventing impairment of heating of the fluidized bed by wall deposition, by dividing the fluidized bed into an inner reaction zone and a heating zone enclosing the latter in a ring shaped manner. In this case, the division is effected by a cylindrical tube. The reaction zone is fluidized by reaction gas and the heating zone is flushed with dilution gas. The granules circulate between the heating zone and the reaction zone and thus carry the heat from the heating zone into the reaction region. What is disadvantageous about this process, however, is that the circulating fluidized bed is of very complex construction and can be produced only with very great difficulty from inert materials (quartz or the like). Moreover, the construction cannot prevent the reaction gas from passing into the region of the heating zone and leading to wall deposition there, which in turn, again impairs reactor heating. The gas feeding arrangement is also very complicated in this process.

U.S. Pat. No. 5,374,413 describes a different method. In order that heating of the fluidized bed is not impaired by wall deposition, the fluidized bed is divided vertically or horizontally into a reaction zone and a heating zone. The division is effected by a wall or a cylindrical tube. The heating in the heating zone is effected by microwave, wherein the wall of the reactor is made of quartz and thus transparent to microwaves. What is disadvantageous, however, is that the heat has to be transported by particle and gas convection from the heating zone to the reaction zone. In the case of vertical separation (reaction zone at the top, heating zone at the bottom), a very high bed results, with the risk of changeover to a slugging mode or the formation of very large bubbles in the reaction region. Wall deposition on the components which separate the zones is also discernible in this process. A major disadvantage is the low efficiency of the microwave heating, which is extremely dependent on the form and size of the reactor and is therefore only of little benefit industrially.

DE 19948395 describes the vertical separation of the fluidized bed into a heating zone and an overlying reaction zone. The separation is effected by the feed device for the reaction gas. The heating zone is fluidized only by dilution gas. The heating is effected by a radiant heater in the region of the heating zone, wherein the fluidized bed wall is embodied in such a way that it is largely transparent to the thermal radiation. The product is taken off from the heating zone. A complicated factor in the case of this process implementation is that the heat has to be transported by particle and gas convection from the heating zone to the reaction zone.

U.S. Pat. No. 6,827,786 likewise describes a vertical separation of the fluidized bed into a heating zone and an overlying reaction zone. The separation is effected by virtue of the fact that only dilution gas flows in at the bottom of the fluidized bed and the reaction gas only flows in further above through radially arranged nozzles. The heating is effected via wall heating in the lower region (heating zone). In the reaction region, too, heating can be effected by wall heating. The difference between this process and those of DE 19948395A1 and U.S. Pat. No. 5,374,413 is by virtue of the fact that the dilution gas is fed to the heating zone in pulsating fashion and this pulsation improves the heat transport from the heating zone into the reaction zone. A further heated reaction zone for converting tetrachlorosilane can also be arranged above the reaction zone. What is disadvantageous here, too, is that the heat has to be transported by particle and gas convection (pulsation) from the heating zone to the reaction zone and wall deposition can still take place in the reaction zone, in particular as a result of the (radial) reaction gas feeding near the wall.

All the processes mentioned in the prior art have the disadvantage that wall deposition of silicon takes place at various components of the reactors and as the operational time increases, and the heating capacity decreases as a result of insulation or components necessary for the process are blocked by the deposition. These effects are associated with increased energy costs, negative safety aspects (blockage of the installation) and outage times of the installation as a result of shutdown and mechanical removal of the deposited layer.

SUMMARY OF THE INVENTION

An object of the invention, therefore, was to provide a process for the continuous production of high-purity, homogenously polycrystalline silicon granules in which wall deposition is greatly reduced, or wholly suppressed, such that efficient heating of the fluidized bed and a long operating campaign of the reactor are made possible. The corresponding apparatus is intended to have a simplest possible construction which fulfils the limited constructional possibilities available, and the heating requirements of the fluidized bed are minimized as far as possible. A further object was, through a suitable choice of the reaction implementation, to reduce the formation and the discharge of silicon dust from the fluidized bed to an extent that additional measures can be obviated. In this case, the product obtained is intended to be produced without additional treatment steps with high purity, with the desired grain size distribution, without any pores, and without any dust.

These and other objects are surprisingly achieved by providing a reactor having two directly abutting zones, a first, or lower zone, into which only dilution gas is fed by a series of nozzles, fluidizing the bed of polycrystalline silicon granules in the lower zone, and reaction gas nozzles supplying reaction gas to a second, or reaction zone, the reaction gas nozzle inlets located above the dilution gas nozzles. The reaction zone is heated. Reaction gas is substantially reacted by the time the reaction gas is able to contact the heated reaction zone walls or reach the top of the fluidized bed, thus severely reducing or eliminating deposition of polycrystalline silicon on reactor components.

BRIEF DESCRIPTION OF THE DRAWINGS

FIG. 1 illustrates one embodiment of the subject invention fluidized bed polysilicon production process.

DETAILED DESCRIPTION OF THE PREFERRED EMBODIMENTS

The invention thus relates to a process for the production of high-purity polysilicon granules by depositing a reaction gas on silicon granules, in a fluidized bed reactor comprising:

(I) a reactor having a reactor space comprising at least two zones lying one above another,
(II) wherein a first, lower zone is weakly fluidized by the introduction of a silicon-free gas into the silicon granules by means of individual nozzles,
(III) a further, reaction zone is connected directly to the first zone,
(IV) this reaction zone is heated via its outwardly bounding wall, and
(V) a silicon-containing reaction gas is introduced as a vertically upwardly directed gas jet into the reaction zone by means of one or a plurality of nozzles at high speed, wherein above the nozzles, local reaction gas jets surrounded by bubble-forming fluidized bed form, within which the silicon-containing gas decomposes at the particle surfaces and leads to particle growth, and
(VI) the reaction gas is introduced in such a way that it has fully or almost fully reacted to chemical equilibrium conversion before it reaches either the fluidized bed wall or the fluidized bed upper surface.

In the process according to the invention, through a suitable choice of the process parameters of the average gas velocity in the two fluidized zones of the fluidized bed, the local gas velocities of the gases or gas mixtures at the exit of the nozzle systems, the pressure and the temperature of the fluidized bed, the positioning of the nozzles relative to one another and relative to the fluidized bed wall, and the residence time of the gases in the fluidized zones of the fluidized bed, a reaction course and thus a concentration profile is produced which ensures that the reaction gas has virtually completely reacted to chemical equilibrium conversion before it reaches either the fluidized bed wall or the fluidized bed surface. As a result, wall deposition on the fluidized bed wall is reduced to a very small amount, which enables the unimpaired heating of the fluidized bed in the region of the reaction zone over a long period of time.

In this case, according to the invention, the reaction gas is introduced as one or more vertically upwardly directed gas jets into a fluidized bed that has been weakly fluidized by means of dilution gas, to be precise, in such a way that one or more local reaction regions form above the feed nozzles within the fluidized bed. In these reaction regions, the reaction gas reacts virtually completely to chemical equilibrium before it reaches the fluidized bed wall or the fluidized bed surface. This makes it possible to permanently heat the fluidized bed at the level of the reaction region conventionally via the wall, without obtaining wall deposition.

The embodiment of the fluidized bed in two zones is achieved by virtue of the fact that the lower zone is fluidized only by means of dilution gas and the reaction gas is introduced into the fluidized bed by nozzles only at a higher level. In the region below the level of the introduction of reaction gas by nozzles, the fluidized bed is only weakly fluidized by means of dilution gas. If this basic fluidization is dispensed with, a spouted bed forms through the reaction gas nozzles, which is not helpful for the process striven for.

The height of the lower zone is designed such that no reaction gas can flow back as far as the nozzles for the dilution gas for the fluidization of the lower zone and block the latter by wall deposition, and preferably lies within the range of 50 to 300 mm.

In contrast to the known methods from U.S. Pat. No. 5,374, 413, DE 19948395 and U.S. Pat. No. 6,827,786, the height of the lower zone in the method according to the invention is insignificant for heating of the fluidized bed and, moreover, does not have to be designed with regard to heating. It has been shown that this zone can be made very flat. Even a height of greater than 50 mm suffices. Additional heating of the zone is feasible in principle, however, and can increase the overall supply of heat into the fluidized bed or compensate for thermal losses in this region.

The amount of dilution gas fed to the lower zone is to be chosen to be so small that the fluidized bed is just, but still reliably, fluidized. Preferably, the dilution gas is fed in an amount such that the gas velocity in the lower zone is 1.2 to 2.3 times, preferably 1.2 to 1.7 times, the minimum fluidization velocity.

The minimum fluidization velocity is dependent on grain size and material data of solid and gas and can be calculated e.g. according to equation (18) Chapter 3 in "FLUIDIZATION ENGINEERING"; D. Kunii, O. Levenspiel; Butterwoth-Heinemann; Second Edition 1991:

$$\frac{1.75}{\varepsilon_{mf}^3 \phi_s} \left( \frac{d_p u_{mf} \rho_g}{\mu} \right)^2 + \frac{150(1-\varepsilon_{mf})}{\varepsilon_{mf}^3 \phi_s^2} \left( \frac{d_p u_{mf} \rho_g}{\mu} \right) = \frac{d_p^3 \rho_g (\rho_s - \rho) g}{\mu^2}$$

where
$\varepsilon_{mf}$ Proportion of voids at the minimum fluidization point
$\phi_s$ Sphericity of the particles
$d_p$ Particle diameter
$\rho_g$ Gas density
$\rho_s$ Solids density
$\mu$ Dynamic viscosity of the gas
g Acceleration due to gravity Lower gas throughputs lead to an undesirable spouted bed in the upper zone, and higher throughputs increase the gas and energy consumption and have adverse effects on the formation of the reaction zone, where an excess of dilution gas leads to the formation of larger bubbles which, at the reaction gas introduction by nozzles, can lead locally to backflows and wall deposition on the nozzle or to the formation of amorphous dust.

The dilution gas, which is fed separately to the lower zone, can be heated to above the fluidized bed temperature and then additionally transports heat into the fluidized bed. In application in practice, it has been shown that the gas is preferably preheated in a conventional heat exchanger with metallic heating elements to temperatures of at least 500° C., more preferably at least 700° C., without demonstrable contamination of the product occurring.

The dilution gas is preferably fed via a plurality of individual nozzles distributed as uniformly as possible over the cross section of the fluidized bed. As a result, a high degree of turbulence is generated in this weakly fluidized region, whereby the formation of agglomerates can be effectively prevented. This is important particularly because the deposited product granules are also taken off from the fluidized bed from this region. In this case, the exit velocity of the dilution gas from the nozzles must be chosen such that a local jet region is preferably formed in each case. The maximum jet velocities lie within the range of 20 to 200 m/s, preferably within the range of 50 to 180 m/s, and most preferably within the range of 75 to 170 m/s. If the velocity chosen is too low, then granules can pass into the nozzles and block them, or the nozzle jets introduce too little turbulence into the lower zone, such that agglomerates are not reliably broken up or the formation thereof is not prevented. If the velocity chosen is too high, the gas jets lead to a mechanical comminution of the silicon granules or to very high rates of solid abrasion.

As reaction gas, use is made of one or more silicon-containing gases (e.g. $SiH_4$, $SiCl_4$, $SiHCl_3$, $SiH_xCl_y$) or mixtures of these gases with a silicon-free gas, such as e.g. hydrogen, nitrogen or argon, as a dilution gas. Trichlorosilane ($SiHCl_3$) diluted with hydrogen ($H_2$) is preferably used as the reaction gas. The molar fraction of trichlorosilane in the reaction gas preferably lies within the range of 0.2 to 0.8 and most preferably within the range of 0.3 to 0.6. In this case, a possibly admixed dilution gas from an annular gap nozzle surrounding the reaction gas nozzle is concomitantly taken into account as well. Together with the dilution gas from the lower zone, the average molar fraction of trichlorosilane over the entire reactor cross section preferably lies within the range of 0.15 to 0.4.

The gases are advantageously preheated before entering the fluidized bed, in order to thus reduce the heating requirement for the fluidized bed. However, such preheating is limited. In the case of the reaction gas, the respective decomposition temperature of the silicon-containing compounds limits the preheating. It has surprisingly been shown by experiment that the reaction gas can be preheated by means of conventional heating technology significantly above the temperatures previously specified in the literature (decomposition temperature of trichlorosilane=350° C.: "Machine for production of granular silicon"; Lord; 2004; U.S. Pat. No. 6,827,786), without decomposition occurring before entry into the fluidized bed and the heating requirement of the fluidized bed can thus be reduced.

The reaction gas can be preheated e.g. by means of a conventional heat exchanger with metallic heating elements. In this case, the gas mixture (trichlorosilane and hydrogen) is preferably preheated to 350° C. to 590° C.

The exit velocity of the reaction gas from the reaction gas nozzles must be chosen such that a jet region arises in this case. The local gas velocities of the gases or gas mixtures at the exit of the nozzle systems lie within the range of 1 to 140 m/s, preferably within the range of 10 to 120 m/s and most preferably within the range of 40 to 70 m/s. The jet velocity can be established through the selection of a suitable nozzle cross-sectional area. If the velocity chosen is too low, then a locally delimited jet region does not form; rather the reaction gas flows away from the nozzle as individual bubbles into the fluidized bed, is distributed immediately over the entire cross section in an undesirable manner and can then lead to the undesirable wall deposition. Moreover, granules can pass into the reaction gas nozzle and block the nozzle. If the velocity chosen is too high, the gas jet leads to a mechanical comminution of the silicon granules or to very high rates of solid abrasion and thus to the production of undesirable silicon dust. In the reaction zone, the average gas velocity lies within the range of 2 to 8 times, preferably within the range of 3 to 6 times, the minimum fluidization velocity.

The throughput of reaction gas per nozzle is limited. Since the reaction gas, limited by the thermal decomposition of the silicon-containing compound, flows in significantly colder than the fluidization bed temperature, e.g. the required reaction temperature for heterogeneous pyrolysis, a local supercooling of the fluidized bed occurs in the jet region. The supercooling in this region and also the size of this region increase as the nozzle throughput increases. If this region becomes too cold or too large, then the reaction selectivity shifts away from the desired heterogeneous toward the undesired homogenous gas phase reaction with formation of amorphous silicon dust. The limit value for the maximum nozzle throughput as derived from experiments can best be characterized as a maximum heat sink, calculated from gas throughput per nozzle, heat capacity of the reaction gas and temperature difference between inflowing reaction gas and fluidized bed temperature present, and lies within the range of 5 to 25 kW per nozzle:

$$\dot{Q}_{sink} = \dot{m}_{RG} * c_{PRG} * (T_{WS} - T_{RG}) \text{ where } \dot{Q}_{sink} \text{ Heat sink [W]}$$

$\dot{m}_{RG}$ Mass flow rate reaction gas $\left[\frac{kg}{s}\right]$ $c_{PRG}$ Heat capacity reaction gas $\left[\frac{kJ}{kgK}\right]$ $T_{FB}$ Temperature fluidized bed [K]

$T_{RG}$ Temperature reaction gas [K]

The distances between the nozzles and the fluidized bed wall should be chosen such that the reaction gas reacts as completely as possible to chemical equilibrium before it reaches the fluidized bed wall. From experiments, an angle for the "reaction front" was determined in a manner virtually equivalent to the jet angle of the jet flow. This angle lies within the range of 9.5° to 18°. In combination with the minimum required residence time and height of the reaction zone, the minimum required distance between wall and nozzle can be determined on the basis of formula (B):

$$A_{W-D} \geq h_{RZ} * \tan \alpha \text{ where}$$

$A_{W-D}$ Distance wall-nozzle [m]

α angle of reaction front

The individual nozzles among one another also must not be too close together, otherwise there is the risk of the individual jets merging together and forming virtually one jet, the limit for the thermal load then being exceeded under certain circumstances. The minimum distance should be chosen such that the ratio of nozzle distance (horizontal distance between the jet axes) to nozzle diameter (internal diameter of the nozzle at the location of the gas exit into the fluidized bed) is greater than 7.5, most preferably greater than 8.5.

In addition to the deposition on the wall of the fluidized bed, a further problem is the deposition of silicon on the reactor components which serve for admitting the reaction gas into the fluidized bed. This deposition on the nozzles can lead as far as blockage of the inlet.

In order to avoid the deposition on the nozzles, the latter, as known from the prior art, can either be cooled (U.S. Pat. Nos. 5,810,934, 6,827,786) or the deposition is avoided by the addition of small amounts of hydrogen chloride gas to the reaction gas (JP 2279513), additionally reducing the formulation of fine dust. U.S. 5,798,137 (page 30, lines 26-49; page 28, lines 44-47) also discloses the use of ring nozzle systems, wherein the reaction gas is fed through an inner nozzle and an annular gap is formed by a ring nozzle enclosing the nozzle, through which annular gap a halogen gas or a mixture of dilution gas and a halogen gas is passed in order to avoid deposition on components in the region of the gas inlet.

The cooling and the protection against deposition are advantageously achieved by means of a ring nozzle system, wherein the reaction gas is passed through the central nozzle and only dilution gas through the ring nozzle. In order that the dilution gas from the ring nozzle brings about not only the cooling but also a shielding effect, the exit velocity at the ring nozzle should surprisingly necessarily be chosen to be lower than the exit velocity at the central nozzle. The velocity, V, at the ring nozzle is in this case preferably chosen within the range of $0.4*v_{central\,nozzle} < v_{ring}$ nozzle$< 0.8*v_{central\,nozzle}$. The velocity and throughput limits mentioned further above are applicable otherwise. If the gas jet from the ring nozzle is too slow, the protective effect for the central nozzle is omitted; if the gas jet from the ring nozzle is faster than the central jet, then this has the effect that the central gas jet is expanded with negative consequences for the formation of the reaction zone.

In this case, the amount of dilution gas through the annular gap must be chosen to have a magnitude such that the central nozzle is reliably protected against wall deposition.

As a result of the weak fluidization in the lower region and the jet characteristic, in the region of the nozzles no reaction gas flows below the level of the nozzle opening and wall deposition is reliably avoided there.

The height of the fluidized bed above the level of the reaction gas exit is chosen to have a magnitude such that the reaction gas reacts as far as possible to a degree greater than 90% of chemical equilibrium before it reaches the fluidized bed surface. This is best characterized by the averaged residence time of the reaction gas in the fluidized bed on the basis of formula (A) below:

$$\bar{t} = \frac{u_{RZ}}{\varepsilon * h_{RZ}} \text{ where } \bar{t} \text{ average residence time [s]}$$

$u_{RZ}$ Superficial gas velocity in the reaction zone $\left[\frac{m}{s}\right]$ ε Porosity of fluidized bed $h_{RZ}$ Height of reaction zone [m]

The residence time of the gases in the upper zone of the fluidized bed lies within the range of 0.1 to 10 seconds, preferably 0.1 to 3 seconds and most preferably 0.2 to 2 seconds. In the case of excessively short residence times, the reaction gas has not yet fully reacted and can still be converted in the outflow region of the fluidized bed in the form of wall deposition or by homogenous gas phase reaction to form dust. By contrast, excessively long residence times lead to unnecessarily high fluidized beds having a correspondingly unfavorable behavior.

By means of the method according to the invention, in direct proximity to the reaction region, the fluidized bed can be heated conventionally and thus cost effectively without having to deal with impediment of heating by wall deposition over a long period of time. In general, the height of the reaction zone suffices for heating the fluidized bed via the wall in this zone. Highly specific and complicated types of heating (microwave, laser), complex reactor arrangements or operating modes (vertical separation of heating and reaction, pulsating gas feeding, circulation systems) are obviated. In the experiments it has surprisingly been shown that a heater arrangement as described in U.S. Pat. No. 7,029,632 is particularly well suited.

The minimum required fluidized bed temperature rises greatly, proceeding from silane, with rising chlorine content of the silicon containing compound used. The bed temperature of the fluidized bed that is required for the process lies within the range of 890 to 1400° C., in the preferred embodiment (use of trichlorosilane) within the range of 890 to 1100° C., and most preferably within the range of 930 to 1000° C.

With regard to the reactor pressure, an implementation within the range of 0 to 7 bar excess pressure, preferably within the range of 0.3 to 4 and most preferably within the range of 0.5 to 3 bar excess pressure, is possible.

In experiments, the process described was operated and investigated with different grain size distributions in the fluidized bed. It was surprisingly found that the reaction conversion and thus the deposition rate do not correlate with the average particle diameter but rather only with the Sauter diameter $d_{32}$. What proved to be particularly advantageous was operation of the fluidized bed having a steady-state grain size distribution, wherein the size of the particles is between 150 and 7000 µm, and the Sauter diameter of the distribution lies within the range of 850 to 1500 µm, more preferably within the range of 950 to 1400 µm.

The control of a stable and steady-state grain size distribution in the fluidized bed is rated as very difficult in the prior art (U.S. Pat. No. 5,798,137, page 6, lines 57-65). In the experiments with the process according to the invention, however, it has been shown that using an online exhaust gas analysis system for determining the reaction conversion in combination with the detection of the amounts of reaction and dilution gas fed, and a computational model for the particle population, the addition of the seed particles and the product take-off can be controlled such that the desired grain size distribution in the reactor and the amount of granules in the fluidized bed can be kept stable and in the steady state over a long period of time. A prerequisite for this in turn is a stable and constant grain size distribution of the seed particles. In this case, the seed particles can be added either continuously or cyclically.

By means of the process implementation according to the invention and using trichlorosilane, the formation of dust as a result of abrasion and homogenous gas phase deposition is reduced to a minimum, and in particular polymeric silicon compounds in the exhaust gas, also referred to as "high boilers", do not occur. Consequently, additional measures can be obviated and the silicon granules are obtained, without additional treatment steps, with high purity, extremely high density with the desired grain size distribution, without any pores, with very low dust content, and with a small content of chlorine.

As a result of the take-off of product granules from the weakly fluidized lower zone of the fluidized bed, through which lower zone only dilution gas flows, the risk of the take-off device becoming overgrown as a result of wall deposition is obviated, and the product granules taken off can be effectively cooled and inertized with little outlay. This is possible for example in a very simple manner by purging with nitrogen in a separate collecting container. A complicated purging device for the separation of reaction gas or gaseous reaction products is therefore not necessary since the probability of silicon-containing gases being able to pass into the product take-off under the given process conditions is only very low.

It has surprisingly been shown that the described arrangement of zones leads to particle segregation, whereby smaller particles preferably remain in the upper zone and large particles preferably pass into the lower zone, from which they can be removed. This yields a product containing a small proportion of small particles, such that additional work steps for classification and separation of a fine fraction can be obviated. In the process according to the invention, the undersized fraction of particles smaller than 150 µm is less than 0.1 percent by mass, without an additional classification step being necessary.

By virtue of the fact that a separate heating zone is not necessary, it is possible to reduce the height of the fluidized bed in comparison with the prior art given the same residence time of the reaction gas and conversion of trichlorosilane to an extent such that it is possible to achieve a stable operating state of the fluidized bed without slugging and therefore without abrasion and attrition of the silicon particles. The polysilicon granules thus deposited therefore have a markedly spherical form with sphericity values within the range of 0.85 to 1 [-], more preferably within the range of 0.9 to 0.99 [-]. The roundness of the particles gives rise to the markedly good flow properties (free flow) and crucial advantages in further processing in the solar and semiconductor industry.

A further advantage of the silicon granules produced by this process resides in deposition free of pore and particle inclusions. Thus, the product in further processing has major advantages as a result of higher abrasion resistance, low degree of outgasing during melting and high bulk densities.

In contrast to the conventional process ("Siemens process") the granules in the fluidized bed, the silicon seed particles in the feed systems and the product in the take-off systems are exposed to a continuous wall contact. In order to avoid contamination of the product in this case, the selection of possible construction materials, in particular for regions exposed to very high temperatures, is very limited. The reaction space (fluidized bed wall, nozzles for dilution gas and reaction gas, product take-off) is preferably produced from high-purity quartz. As an alternative, materials such as graphite, carbon fiber reinforced graphite, silicon carbide or carbon fiber reinforced silicon carbide can be coated with silicon in order to avoid contamination of the product, particularly contamination with carbon or with silicon carbide particles. The constructional possibilities are greatly restricted on account of the specific properties of all these materials, for which reason the simple construction of the fluidized bed deposition system is particularly advantageous with respect to the method according to the invention.

FIG. 1 illustrates an apparatus embodiment for carrying out the process:

The reaction space is formed by a reaction tube (1), in which the fluidized bed (2) is situated and through which reaction gas and dilution gas are passed. The reaction tube is preferably enclosed by a pressure-bearing vessel (3) and is composed of a material which is as pure as possible and which contaminates the silicon granules as little as possible, preferably of high-purity quartz. The tube can be embodied in cylindrical fashion with a constant diameter or else with a diameter that increases toward the top. The dilution gas is passed via individual nozzles (4) into the lower zone (5) of the fluidized bed, a local jet region 23 forming at each nozzle. These individual jets disperse upward to form a bubble-forming fluidized bed (2). The reaction gas is passed into the reactor via one or more reaction gas feeds (6) through the reactor base (37) and flows into the fluidized bed at a defined height above the level of the dilution gas nozzles (4). As a result, a fluidized bed region (5) through which only dilution gas flows forms between the gas outlet of the reaction gas and the gas outlet from the dilution gas nozzles. The dilution gas nozzles (4) and the reaction gas feeds (6) are also produced from a material which is as pure as possible and which contaminates the silicon granules as little as possible, preferably likewise from high-purity quartz. The reaction gas feeds each comprise a central reaction gas nozzle (7) and a ring nozzle (8) enclosing the latter, such that an annular gap (9) is formed for feeding dilution gas.

The reaction gas (10) is mixed from silicon-containing gas (11) and dilution gas (12) and preheated by means of a heat exchanger (13). The dilution gas to the annular gap is fed separately, and the dilution gas for the fluidization of the lower zone is preheated by means of a heat exchanger (14). All the amounts of gas are detected and controlled by means of measuring and control devices (15).

By virtue of the arrangement, proceeding from the reaction gas feeds (6), a jet region (30) forms in each case within a bubble-forming fluidization bed (2). A suitable heating device (16) is arranged outside the reaction tube (1) and can be used to heat the fluidized bed over the entire height of the upper zone (17). In order to reduce thermal losses, the reactor tube (1) above and below the heating device and also the heating device itself are surrounded by a thermal insulation (18). The thermal insulation (18) of the reaction tube (1) above the fluidized bed can be adapted in terms of its embodiment (type/thickness/form/material) such that thermal losses through radiation from the bed surface are minimized, and at the same time the tube wall already cools to temperatures below the decomposition temperature as near as possible to the bed surface, such that even a gas mixture that has not completely reacted does not lead to a wall deposition. The gases flowing out of the fluidized bed are discharged from the gas space (20) of the reactor through an exhaust gas opening (19). From the exhaust gas flow, a partial flow is passed via an analysis device for online determination of the exhaust gas composition (21). The amount of reaction gas and dilution gas fed is detected by means of measuring devices (15) and forwarded together with the exhaust gas composition to a computer unit (22) for controlling the addition of silicon seed particles and for the take-off of product granules.

The silicon seed particles (23) can be metered into the gas space (20) of the reactor by means of a metering device (24) and a feed tube (25), and from the gas space they fall downward into the fluidized bed (2). Silicon granules (26) are taken off from the lower zone (5) of the fluidized bed via a take-off tube (27) and a metering device (28) and led from the reactor via the reactor base (37). In the Examples below, Example 1 relates to a preferred process using the apparatus described, while Examples 2-5 illustrate processes, which while not described in the prior art, are operated with parameters which severely reduce industrial utility.

Example 1

Process A (Ideal Process Implementation)

In a reactor having a diameter of 400 mm given a dilution gas amount of 120 Nm3/h hydrogen through the lower zone, a reaction gas amount of 44 Nm3/h hydrogen and 240 kg/h trichlorosilane, a jet velocity at the exit of the reaction gas nozzle of 60 m/s, a reactor pressure of 1.4 bar excess pressure, a bed temperature of 960° C., a particle size distribution of between 150 µm and 7000 µm with a Sauter diameter $d_{32}$ of 950 µm and an electrical heater power of 120 kW, the following result was achieved. More than 9 kg/h silicon granules were deposited with a quality suitable for solar applications. A reaction conversion of greater than 85% of the chemical equilibrium conversion was thereby achieved with this reaction implementation. In this case, the wall deposition in the region of the fluidized bed was less than 0.05%, and the formation of dust as a result of homogenous gas phase reaction was less than 2%. Dust components in the exhaust gas dust as a result of abrasion could not be detected. With a reactor operational time of 4 weeks and production of more than 5 t, the suitability of the heating and process concept was demonstrated.

Example 2

Reaction Gas too Fast

In a reactor having a diameter of 400 mm given a dilution gas amount of 100 Nm3/h hydrogen through the lower zone, a reaction gas amount of 44 Nm3/h hydrogen and 240 kg/h trichlorosilane, a jet velocity at the exit of the reaction gas nozzle of 120 m/s, a reactor pressure of 1.0 bar excess pressure, a bed temperature of 960° C., a particle size distribution of between 150 µm and 7000 µm with a Sauter diameter $d_{32}$ of 950 µm and an electrical heater power of 114 kW, the following result was achieved. More than 7 kg/h silicon granules were deposited with a quality suitable for solar applications. An analysis of the exhaust gas dust revealed that the proportion of abrasion is very high in this process; it was 18% since grinding effects as a result of particle collisions occur as a result of the high gas exit velocities (caused by the lower pressure in comparison with process A) at the reaction gas nozzle.

Example 3

Reaction Gas too Slow

In a reactor having a diameter of 400 mm given a dilution gas amount of 120 Nm3/h hydrogen through the lower zone, a reaction gas amount of 34 Nm3/h hydrogen in an annular gap 10 Nm3/h hydrogen and 200 kg/h trichlorosilane in the central reaction gas nozzle, a jet velocity at the exit of the reaction gas nozzle of 20 m/s, a reactor pressure of 1.4 bar excess pressure, a bed temperature of 960° C., a particle size distribution of between 150 µm and 7000 µm with a Sauter diameter $d_{32}$ of 950 µm and an electrical heater power of 110 kW, the following result was achieved. More than 6.5 kg of silicon granules per hour were deposited with a quality suitable for solar applications. In this case, the wall deposition in the region of the fluidized bed was more than 3% and the formation of dust as a result of homogenous gas phase reaction was more than 15%. An analysis of the exhaust gas dust revealed that the proportion of abrasion is negligibly small and only amorphous dust formation is involved. It was determined metrologically that solid circulation gyrations occur at the reaction gas velocity chosen, leading to entrainment of reaction gas to hot reactor wall surfaces. This reaction gas then deposits on the hot reactor surfaces. An additional problem in this process was an undesirably high proportion of homogenous gas phase reaction, which was caused by locally very high molar fractions of chlorosilane.

Example 4

Too Much Bottom Gas

In a reactor having a diameter of 400 mm given a fluidizing gas amount of 240 Nm3/h, a reaction gas amount of 44 Nm3/h hydrogen and 240 kg/h trichlorosilane, a jet velocity at the exit of the reaction gas nozzle of 60 m/s, a reactor pressure of 1.4 bar excess pressure, a bed temperature of 960° C., a particle size distribution of between 150 µm and 7000 µm with a Sauter diameter $d_{32}$ of 950 µm and an electrical heater power of 145 kW, the following result was achieved. 5 kg of silicon granules per hour were deposited. In this case, the wall deposition in the region of the fluidized bed was 1%, the formation of dust as a result of homogenous gas phase reaction was 21%. An analysis of the exhaust gas dust revealed that the proportion of abrasion was approximately 9% and of amorphous dust formation was approximately 14%. In this process, a high amount of fluidizing gas led to a greatly increasing gas bubble size, the diameter of which corresponded to the reactor cross section. As a result of the large bubble diameter, amounts of granules piled up and mechanical vibrations thus occurred. In addition to the huge mechanical loading on the apparatus, it was also possible to ascertain breaking and abrasion of granule particles and hence a decrease in the sphericity on the silicon granules to below 0.9. Since, in the bubble, the reaction gas cannot make contact with the surface of the granules, an increased homogenous gas phase deposition and a worsened reaction gas conversion take place. As a result of the lower deposition rate, the increased production of dust and the reduced reactor operational time, an economically expedient production of silicon granules is not possible with such a process.

Example 5

Little Bottom Gas; Spouted Bed

In a reactor having a diameter of 400 mm given a fluidizing gas amount of 90 Nm3/h, a reaction gas amount of 44 Nm3/h hydrogen and 240 kg/h trichlorosilane, a jet velocity at the exit of the reaction gas nozzle of 60 m/s, a reactor pressure of 1.4 bar excess pressure, a bed temperature of 960° C., a particle size distribution of between 150 µm and 7000 µm with a Sauter diameter $d_{32}$ of 950 µm and an electrical heater power of 110 kW, the following result was achieved. More than 8 kg of silicon granules per hour were deposited with a quality suitable for solar applications. In this case, the wall deposition in the region of the fluidized bed was less than 0.5%, and the formation of dust as a result of homogenous gas phase reaction was less than 10%. After a reactor operational time of 2 days, the reactor wall deformed owing to a local temperature overheating and the reactor had to be shut down. An analysis revealed that, on account of the small amount of bottom gas, the movement of the silicon granules in the edge region of the fluidized bed stagnated and the local overheating occurred as a result, wherein the granules were sintered. A spouted bed formed at the center. The reactor cannot be operated stably over a relatively long time and therefore economically with this process.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the production of high-purity polysilicon granules comprising depositing a reaction gas on silicon granules in a fluidized bed reactor, the process comprising:
providing a reactor having a reactor wall defining the extent of the fluidized bed, the reactor having a reactor space comprising at least two zones lying one above the other, wherein a first, lower zone is weakly fluidized by the introduction of a silicon-free gas into silicon granules contained in the lower zone, wherein the height of the lower zone is within the range of 50 to 300 mm, by means of a plurality of individual dilution gas nozzles, wherein the maximum exit velocity of the dilution gas from the nozzles is within the range of 20 to 200 m/s and wherein the dilution gas is fed in an amount such that the gas velocity in the lower zone is 1.2 to 2.3 times the minimum fluidization velocity, and a second, reaction zone directly abutting the first, lower zone, the reaction zone heated via its outwardly bounding reactor wall,
introducing a silicon-containing reaction gas as a vertically directed gas jet into the reaction zone by one or a plurality of reaction gas nozzles, wherein the local gas velocities of the gases or of the gas mixtures at the exit of the nozzle systems are within the range of 1 to 140 m/s, wherein above the reaction gas nozzles local reaction gas jets surrounded by bubble-forming fluidized bed form, within which the silicon-containing gas decomposes at silicon particle surfaces and leads to silicon particle growth,
introducing the reaction gas such that it has fully reacted or reacted to at least 85% chemical equilibrium conversion before it reaches either the reactor wall or the fluidized bed upper surface; and
wherein in combination with the detection of the amounts of reaction and dilution gas fed and a computational model for the particle population, the addition of seed particles and the product take-off are controlled such that the desired grain size distribution in the reactor and the amount of granules in the fluidized bed is kept stable at a steady state over a production campaign.

2. The process of claim 1, wherein the height of the lower zone is such that no reaction gas flows back as far as the dilution gas nozzles.

3. The process of claim 1, wherein the maximum exit velocity of the dilution gas from the nozzles is within the range of 50 to 180 m/s.

4. The process of claim 1, wherein the reaction gas comprises one or more silicon-containing gases of the formula $SiH_xCl_y$ where x and y are 1 to 4 and the sum of x and y is 4, or mixtures of said gases with one or more silicon-free gases selected from the group consisting of hydrogen, nitrogen and argon, as dilution gas(es).

5. The process of claim 1, where the reaction gas comprises one or more of $SiH_4$, $SiCl_4$ or $SiHCl_3$, diluted with hydrogen.

6. The process of claim 1, wherein the molar fraction of trichlorosilane in the reaction gas is within the range 0.2 to 0.8.

7. The process of claim 1, wherein the average molar fraction of trichlorosilane, together with the dilution gas from the lower zone over the entire reactor cross section, is within the range 0.15 to 0.4.

8. The process of claim 1, wherein the local gas velocities of the gases or of the gas mixtures at the exit of the nozzle systems are within the range of 10 to 120 m/s.

9. The process of claim 1, wherein in the reaction zone the average gas velocity lies within the range of 2 to 8 times the minimum fluidization velocity.

10. The process of claim 1, wherein the minimum distance between the nozzles is chosen such that the ratio of nozzle distance, expressed as the horizontal distance between the jet axes, to nozzle diameter expressed as the internal diameter of the nozzle at the location of the gas exit into the fluidized bed, is greater than 7.5.

11. The process of claim 1, wherein the reaction gas nozzles comprise ring nozzles for dilution gas around a central nozzle for reaction gas, and wherein the exit velocity at the ring nozzle is less than the exit velocity at the central nozzle.

12. The process of claim 11, wherein the dilution gas is fed in an amount such that the gas velocity in the lower zone is 1.2 to 1.7 times the minimum fluidization velocity.

13. The process as claimed in claim 11, wherein the velocity at the ring nozzle lies within the range of $$0.4 * v_{central\ nozzle} < v_{ring\ nozzle} <= 0.8 * v_{central\ nozzle}.$$

14. The process of claim 1, wherein the residence time of gases in the reaction zone of the fluidized bed lies within the range 0.1 to 10 seconds.

15. The process of claim 1, wherein the bed temperature of the fluidized bed is within the range of 890° C. to 1400° C.

16. The process of claim 1, wherein the reactor pressure is within the range of 0 to 7 bar excess pressure.

17. The process of claim 1, wherein the operation of the fluidized bed has a steady-state grain size distribution, wherein the size of the particles is between 150 and 7000 µm, and the Sauter diameter of the distribution lies within the range of 850 to 1500 µm.

18. The process of claim 1, wherein an undersized fraction of particles smaller than 150 µm is less than 0.1 per cent by mass, without any additional classification step.

19. The process of claim 1, wherein the deposited polysilicon granules have a markedly spherical shape with sphericity values within the range of 0.85 to 1[-].

* * * * *